United States Patent [19]

Spraggins et al.

[11] Patent Number: 4,989,808
[45] Date of Patent: Feb. 5, 1991

[54] SLIDING POCKET DOOR FOR AIRCRAFT USE CAPABLE OF NON-DESTRUCTIVE BLOW-OUT

[75] Inventors: Michael R. Spraggins, San Antonio, Tex.; Charles F. Steel, Huntington Beach, Calif.

[73] Assignee: MSA Aircraft Interior Products, Inc., San Antonio, Tex.

[21] Appl. No.: 376,852

[22] Filed: Jul. 7, 1989

[51] Int. Cl.$^5$ .............................................. B64C 1/14
[52] U.S. Cl. ................................. 244/118.5; 49/177; 244/129.5
[58] Field of Search ............... 244/129.4, 129.5, 118.5; 49/208, 177

[56] References Cited

U.S. PATENT DOCUMENTS 2,565,383  8/1951  Linebaugh ............................ 49/177
3,136,538  6/1964  Dimmitt et al. ...................... 49/177

FOREIGN PATENT DOCUMENTS 1218290  6/1966  Fed. Rep. of Germany ... 244/129.5
2357103  5/1975  Fed. Rep. of Germany ... 244/129.5

Primary Examiner—Charles T. Jordan
Assistant Examiner—Michael J. Carone
Attorney, Agent, or Firm—Gunn, Lee & Miller

[57] ABSTRACT

A sliding pocket door adapted for aircraft use comprising two generally tabular door segments each laying in a common sliding plane and each attached to a carrier frame which is mounted to an aircraft bulkhead. Each door segment is attached to its carrier frame by unique hinges that allow the door segment to rotate out of the sliding plane while simultaneously dropping along their axes of rotation. This rotation will allow a non-destructive depressurization of the doors, for example during rapid decompression in the aircraft.

11 Claims, 5 Drawing Sheets

SLIDING POCKET DOOR FOR AIRCRAFT USE CAPABLE OF NON-DESTRUCTIVE BLOW-OUT

FIELD OF THE INVENTION

Present invention relates to a sliding pocket door for use in the interior of a cabin class aircraft, which door is capable of nondestructive blow-out and, more particularly, a pocket door with extensible hinges that are capable of allowing the pocket door segments to drop vertically on their axes of rotation as the door segments rotate out of their sliding plane.

BACKGROUND

Aircraft interiors, especially those of large corporate jets, are often subject to extensive modifications of their interior to fit the needs of individual corporate clients. Aircraft interior designers often prefer to use doors which slide into pockets in the bulkhead because such doors are more aesthetically pleasing and will allow greater latitude of design. These doors are called "pocket doors" and consist of two segments which slide horizontally in a common sliding plane, which sliding plane is perpendicular to the floor of the aircraft interior. When the door is in a closed position, the door segments present a uniform plane parallel to the bulkhead into which they recess (the "pockets"), thereby giving the interior designer an unbroken plane on which to create designs. When the pocket door is in an open position, the door segments are recessed into the bulkhead pockets and the passengers can pass through.

However, Federal Aviation Agency regulations require doors of an aircraft interior to be capable of withstanding nondestructive blow-out. That is, if there is sudden decompression in one portion of the aircraft interior, the aircraft door must be capable of blowing out without shattering. The purpose of such nondestructive blow-out is to avoid injury to aircraft occupants by flying debris.

Presently, aircraft utilizing pocket doors contain blow-out panels whereby sections of the door segments are releasably retained to the door segments by means of lanyards.

SUMMARY OF THE INVENTION

The pocket door of the present invention represents an improvement over the previous blow-out doors in that it is capable of nondestructive blow-out when in a closed position by means of a unique extensible hinge. The extensible hinge allows rotation of the door segments out of their sliding plane during blow-out.

More specifically, the present invention relates to door segments to that articulate about their axes of rotation during blow-out while their axes are simultaneously moving parallel to the sliding plane. This combination of rotation simultaneous with movement of their axes allows the door segments to clear the bulkhead and to clear the hinges.

It is also the purpose of this invention to allow the pocket door segments to move vertically along their axes of rotation as their axes are moving parallel to the sliding plane. The purpose of such vertical movement of the pocket door segments being to allow the door segments to clear curved headliners. Retractable footers at the base of the door segments allow the bottom portion of the door segments to retract allowing the door to drop vertically and clear curved headliners.

It is the further purpose of this invention to provide for aircraft doors recessible into bulkhead pockets which doors, when in a closed position, allow a clean plane to be presented to the aircraft occupants and, in particular, allow the hinges to be hidden from view.

BRIEF DESCRIPTION OF THE PREFERRED EMBODIMENT

The following description applies to aircraft interiors regardless of whether the interior has a curved or a flat headliner but the description is also more particularly adapted to the invention as it relates to aircraft interiors with curved headliners and the additional structure required therefore.

Figure 1:
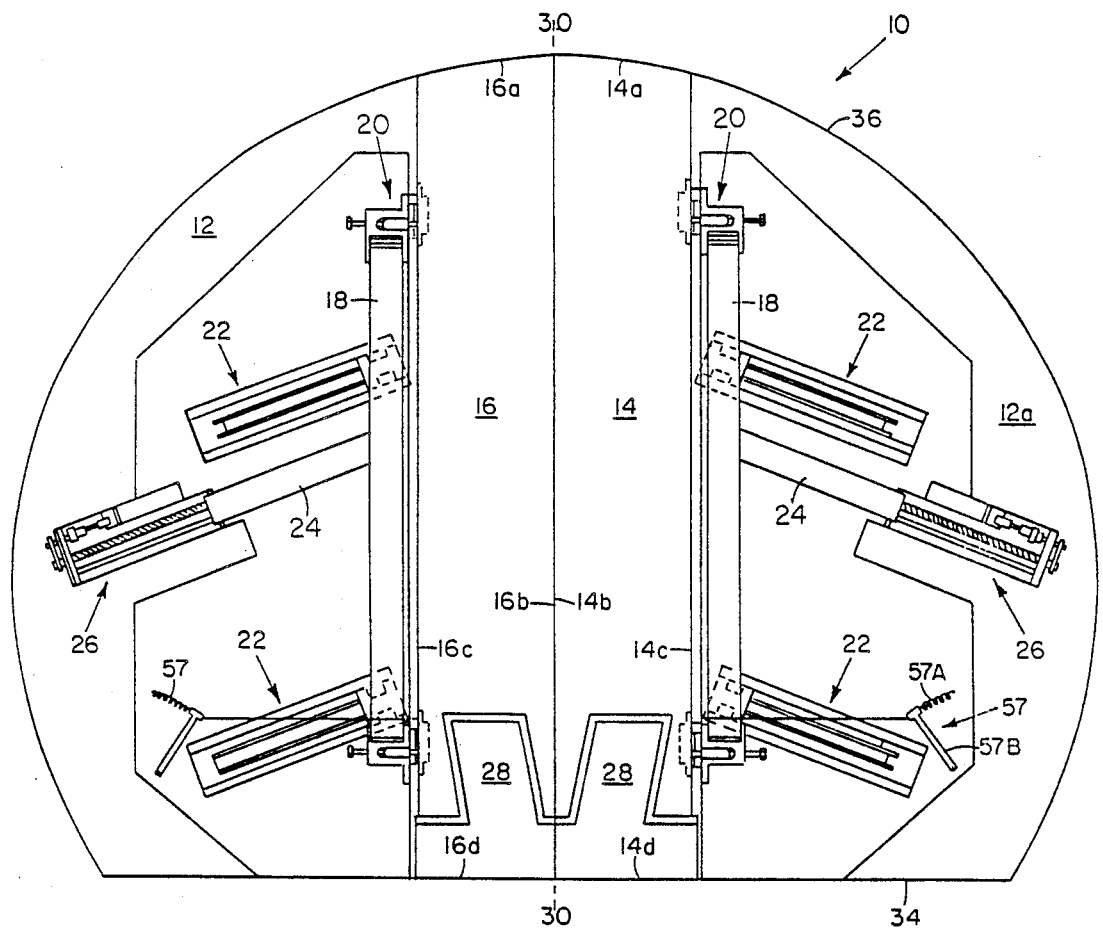
FIG. 1 is a perspective view showing the interior of the pocket door segments and the bulkhead.

FIG. 1 illustrates pocket door 10 operatively attached to aircraft bulkhead 12, inside of an aircraft, usually a cabin class twin, or larger. Pocket door 10 consist of two sliding door segments 14 and 16. Door segment 14 will sometimes be referred to as the right hand door segment and door segment 16 will sometimes be referred to as the left hand door segment. Door segments 14 and 16 are attached to carrier means 18 by articulation means 20. Carrier means 18 is attached to track means 22 which is, in turn, located on and fixed to bulkhead 12. Drive arm 24 connects carrier means 18 to drive means 26. Footers 28 are adapted to slide retractively into door segments 14 and 16 in a manner described more fully below.

Figure 2:
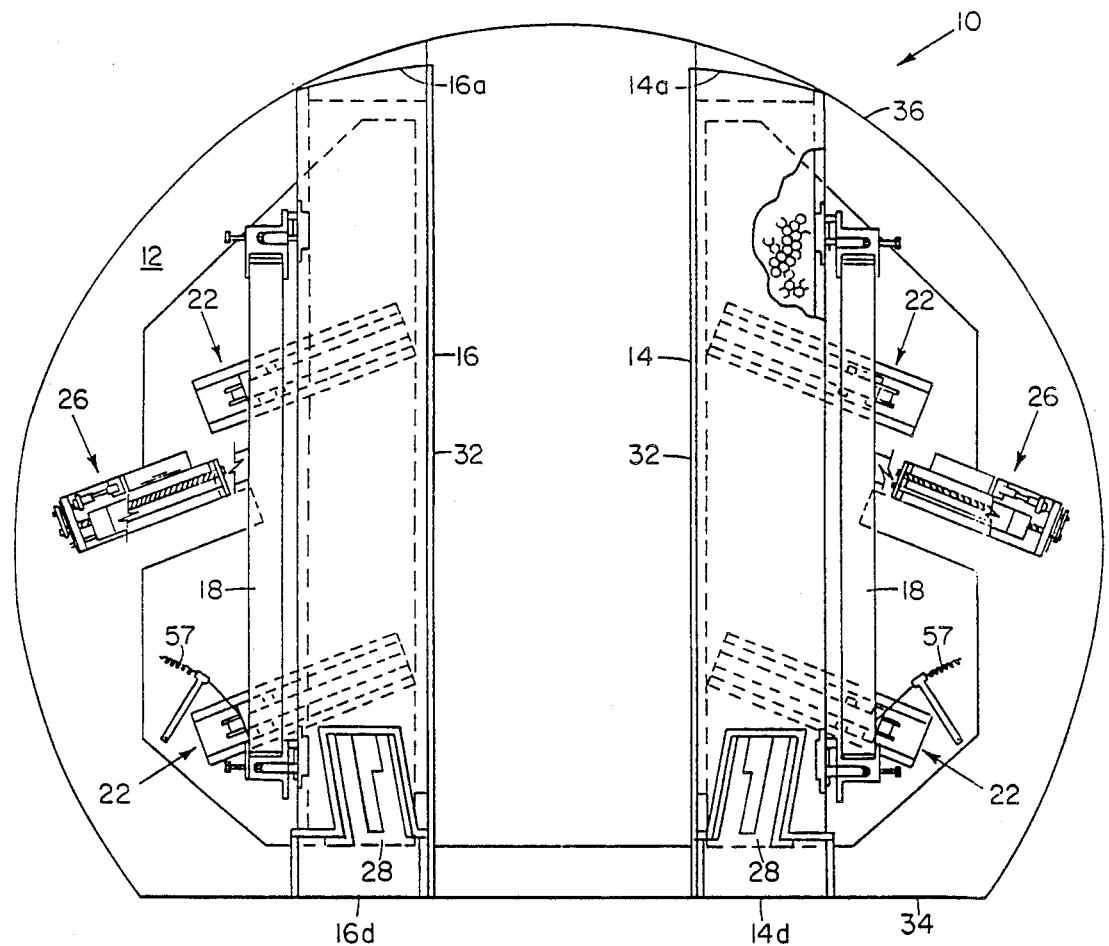
FIG. 2 is an elevation of the pocket doors in an open position also showing views of the interior of the bulkhead.
Figure 2A:
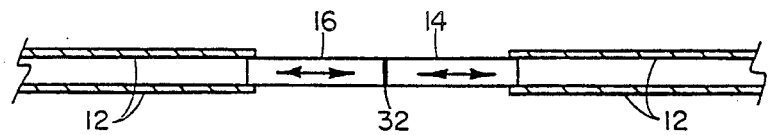
FIGS. 2A and 2B are cross-sectional elevations of the pocket door in open and closed positions and illustrating the pockets in the bulkheads.
Figure 2B:

Generally, right hand door segment 14 and left hand door segment 16 are bilaterally symmetrical along axis 30. As can be seen in FIG. 1, door segments 14 and 16 are generally tabular with substantially similar exterior dimensions. They are sized and shaped to fit within the bulkhead pockets as seen in FIG. 2A and 2B. Although the general outline of door segments 14 and 16 is tabular, upper edges 14A and 16A may be curved as necessary to conform to curved aircraft headliner 36. As can also be seen in FIG. 2, 2A and 2B, door segments 14 and 16 slide between a closed position as illustrated in FIG. 2A and an open position as illustrated in FIG. 2B. It can also be seen in FIG. 2B that when pocket door 10 is closed, articulation means 20 are hidden from view of the aircraft occupants, being recessed into the pockets of bulkhead 12. It can be seen that door segments 14 and 16 slide in the same plane, that plane being parallel to the plane of bulkhead 12. This plane will be referred to as the "sliding plane." In the closed position (FIG. 2A), side 14B of door segment 14 and side 16B of door segment 16 meet in a generally flush attitude at axis 30.

Returning to FIG. 1, it is seen that carrier 18 generally lies parallel to the longitudinal axis of door segments 14 and 16 and attaches to sides 14C and 16C of door segments 14 and 16 respectively. In the preferred embodiment, articulation means 20 are located at two locations along sides 14C and 16C, respectively, in such a manner as to provide vertical support along the longitudinal axis of door segments 14 and 16.

Door segments 14 and 16 are preferably constructed of a strong, durable, lightweight material that will not warp or bend. Aluminum honeycomb is such a material and is available from Alcoa Aluminum. Along sides 14B and 16B are located pressure sensitive strip switches 32, which will, in the electrical embodiment of the invention, de-energize drive means 26 when pressure is exerted thereon. This also acts as a safety feature to prevent one from getting trapped between door segments 14 and 16 as pocket door 10 closes. Pressure sensitive strip switches 32 can be seen in FIG. 2B and FIG. 6.

In operation, pocket door 10 opens and closes either manually or when a conveniently located electrical switch is activated. The switch energizes drive means 26 which is powered by the aircraft's electrical system. If pocket door 10 is in an open position, it will close when the switch is activated. If it is in a closed position, it will open. Track means 22 along which door segments 14 and 16 ride, are set at an angle to the plane of floor 34 of the aircraft interior, when headliner 36 is curved, and are set parallel to floor 34 (and perpendicular to carrier 18) when a flat headliner is used (not shown). This allows door segments 14 and 16 to rise toward curved headliner 36 as door segments 14 and 16 move from an open position to a closed position. As door segments 14 and 16 rise, biased footers 28 allow lower edges 14D and 16D to extend downwards to maintain contact with floor 34. When pocket 10 is fully closed, pressure sensitive strip switch 32 de-energizes drive means 26 and door segments 14 and 16 are flush with bulkhead 12, floor 34, curved headliner 36, and with each other in the sliding plane. Thus, pocket door 10 meets in a substantially unbroken plane, bulkhead 12 while articulation means 20 remain hidden from view of aircraft occupants. This allows the aircraft interior designer greater latitude, having a substantially unbroken plane in which to decorate. Moreover, when pocket door 10 is in the open position, there are no headers or other structure between floor 34 and curved headliner 36.

Figure 1A:
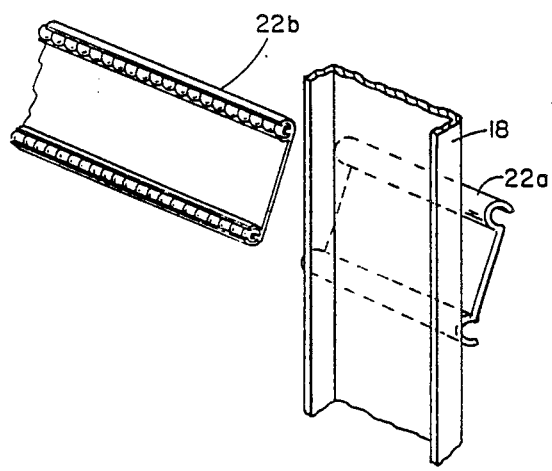
FIG. 1A is a perspective view of the carrier means and channel apparatus.

A set of two track means 22 (per door segment) are preferably located at two places along carrier means 18 so as to provide vertical support and tracking to carrier means 18 and ultimately to door segments 14 and 16. Track means 22 are more readily visible in FIG. 1A. Track means 22 consists of two parts, channel 22A and slide 22B. In the preferred embodiment, channel 22A is rigidly attached to carrier means 18. Slide 22B is rigidly mounted to bulkhead 12. Channel 22A is adapted to receive slide 22B and move freely thereon.

Figure 1B:
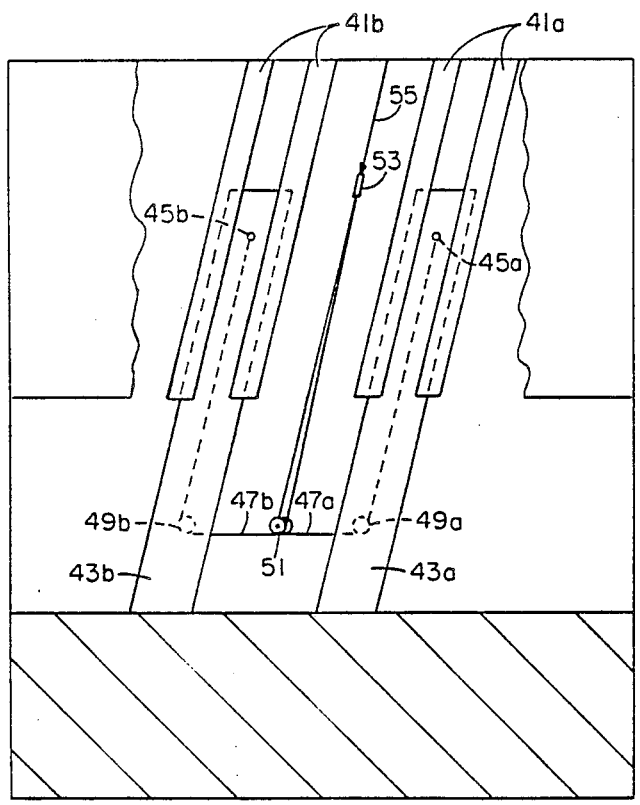
FIG. 1B is an elevational view of the footers with a cutaway of the interior mechanism thereof.

FIG. 1B illustrates the extensible footers 28. As door segments 14 and 16 open and close in normal use, they rise and fall in the sliding plane so as to fit flush with curved headliner 36 when pocket door 10 is closed. This accounts for the non-normal (non-perpendicular) angular relation between longitudinal axis 30 and track means 22. To maintain a flush relation between floor 34 and lower edges 14D and 16D, footers 28 rise into their respective door segments 14 or 16 as pocket door 10 opens, and fall as it closes. Of course, in an alternate embodiment for use with a flat headliner (not shown) door segments 14 and 16 will not rise and fall as pocket door 10 opens and closes, in which case footers 28 will not be required.

Tracks 41A and 41B enclose guide bars 43A and 43B to allow for extension and retraction of footers 28. Anchors 45A and 45B fix cables 47A and 47B to the top of guide bars 43A and 43B, respectively. Cables 47A and 47B loop around pulleys 49A, 49B and 51 and join together at 53 to form single cable 55 which is spring 57A and pivot bar 57B loaded at 57 as seen in FIG. 1.

When sudden cabin decompression occurs or other pressure is suddenly exerted upon door segments 14 and 16 when they are in the closed position, articulation means 20 allows door segments 14 and 16 to rotate out of the sliding plane while simultaneously dropping toward floor 34. The dropping downward along the rotation axes—represented by sides 14C and 16C—occurs simultaneously with retraction of footers 28 into door segments 14 and 16. This downward movement as door segments 14 and 16 rotate out of the sliding plane allows upper edges 14A and 16A to clear curved headliner 36. If door segments 14 and 16 did not shift downward, upper edges 14A and 16A would strike and damage curved headliner 36 or pocket door 10 when door segments 14 and 16 rotated out of the sliding plane. The purpose, then, of articulation means 20, is to allow a compound motion: the rotation of one or both of door segments 14 and 16 in either direction out of the sliding plane, while simultaneously allowing a shift downward along their axes of rotation. The unique design of articulation means 20, as more specifically set forth in FIGS. 3 and 4 and described below, accomplishes such a purpose.

Figure 3:
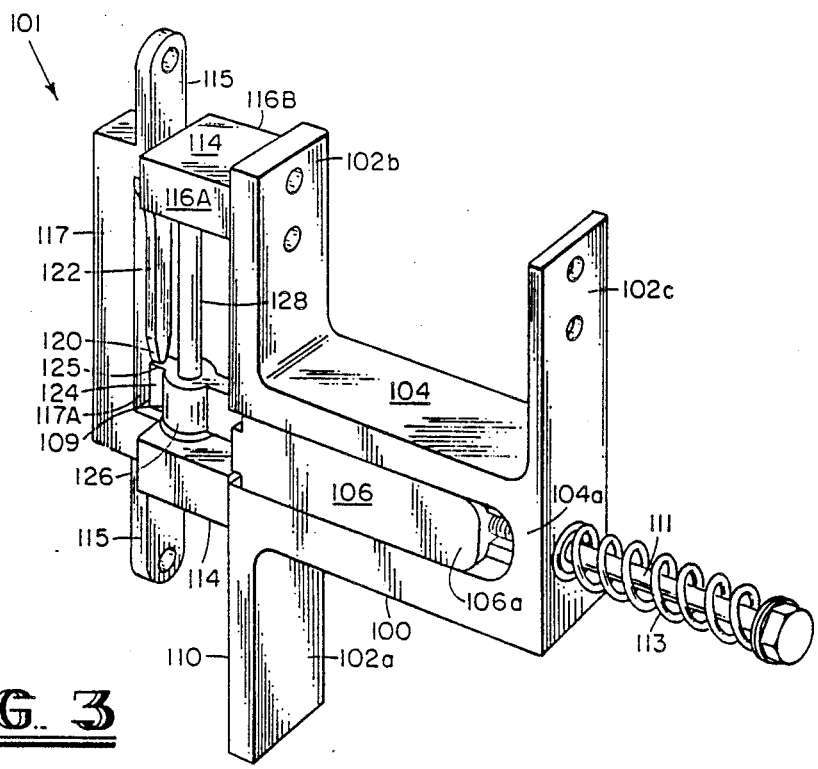
FIG. 3 is a perspective of the hinge and its normal operating position.
Figure 4:
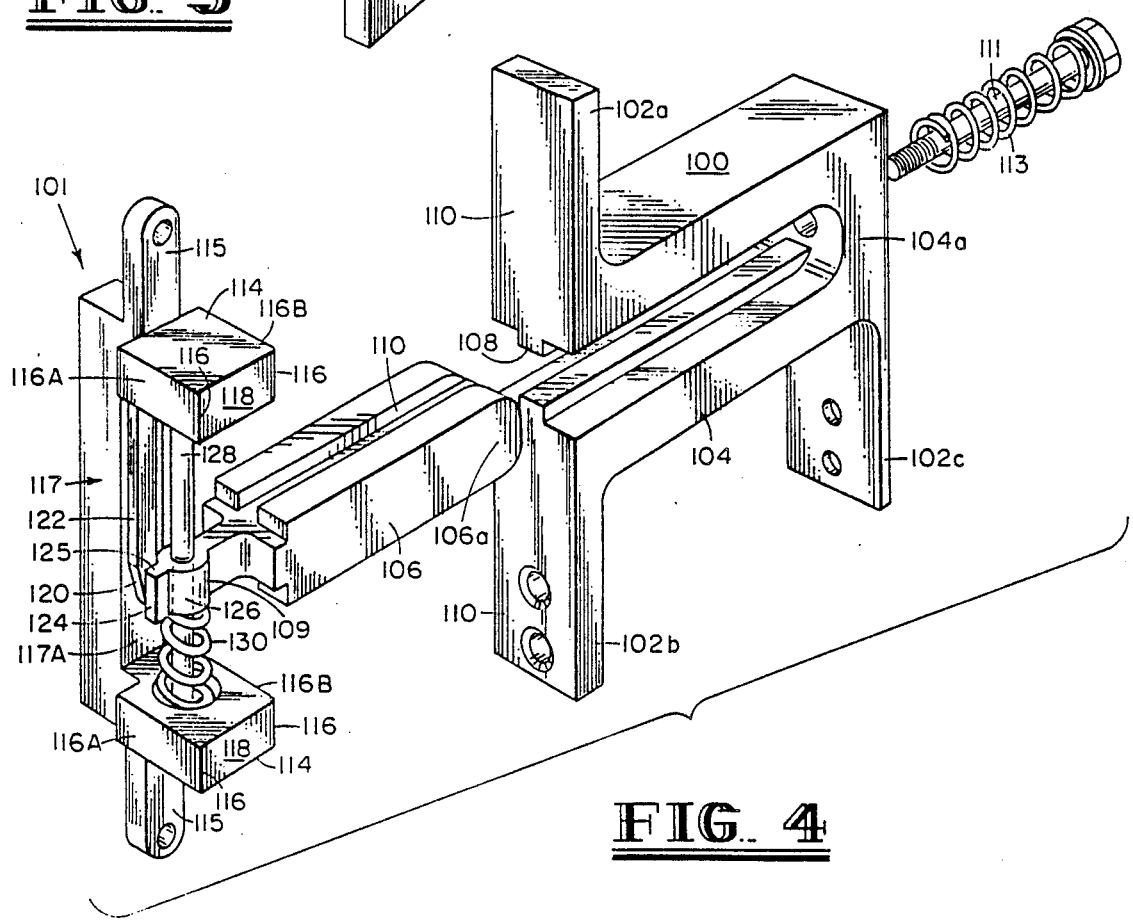
FIG. 4 is a an exploded perspective of the hinge in its rotated or blow-out position.

FIGS. 3 and 4 illustrate articulation means 20. FIG. 3 illustrates articulation means 20 in normal operating or "loaded" position prior to emergency release and rotation of door segments 14 and 16 out of the sliding plane. FIG. 4 illustrates articulation means 20 as it appears in the emergency, "unloaded", or "blow-out" position when door segments 14 and 16 lie out the sliding plane.

FIGS. 3 and 4 illustrate the two main components of articulation means 20. They are frame 100 and extensible turret 101. Frame 100 contains carrier support arms 102A, 102B, and 102C which anchor articulation means 20 by screws or other fastener means to carrier means 18. Frame 100 also comprises of, as a bulk center section, receiving block 104. As can be seen in FIGS. 3 and 4, receiving block 104 is shaped to confine therein sliding block 106 of turret 101 with receiving block 104 and sliding block 106 engageable in male/female relation. Sliding block 106 contains guide channel 110 therein which "mates" with guide track 108 of receiving block 104. Guide track 108 and guide channel 104 maintain proper alignment of frame 100 and turret 101 during emergency rotation of door segments 14 and 16 when they are forced to rotate out of the sliding plane. Bolt 111 is threaded into distal end of sliding block 106A and extends slidably through receiving block end 104A. It contains thereon spring 113 to bias sliding block 106 towards receiving block end 104A. As adjusting bolt 111 is threaded into distal end of sliding block 106A, spring 113 is compressed and turret 101 is thereby forced against frame 100, the magnitude of such force being a function of the compression of spring 113. The greater the compressive force, the greater force required to rotate turret 101 off frame 100 as described in more detail below.

Turret 101 is extensible and rotatable during emergency release of door segments 14 and 16. As can be seen from FIGS. 3 and 4, turret 101 lays against bearing face 110 of frame 100. Standoff blocks 114 abut bearing face 110. Bearing face 110 is located on carrier support arms 102A and 102B lateral to the female opening of receiving block 104. Turret 101 contains door support members 115 which preferably locate and fix turret 101 to door segments 14 or 16. Thus, door segments 14 and 16 are attached to turret 101, and carrier means 18 is attached to frame 100. Frame 100 and turret 101 are operatively engaged along shaft 128 as more fully set forth below. Standoff blocks 114 have faces 116A and 116B, and loaded releasing face 118 thereon. When door segments 14 and 16 are in their normal or loaded position (normal meaning in the sliding plane) releasing faces 118 of standoff blocks 114 are in flush relation to bearing surface 110 and located as illustrated in FIG. 3. When door segments 14 and 16 are in a "blow-out" or unloaded position, having rotated out of the sliding plane, turret 101 is in the position illustrated in FIG. 4, with either faces 116A or 116B flush with bearing face 110 (depending upon which way door segments 14 and 16 rotated). Releasing face 118 meets unloaded faces 116A and 116B at pivot edges 116. Standoff blocks are part of turret block 117 which makes up the backbone of turret 101.

As can be seen in FIGS. 3 and 4, turret 101 contains door support members 115 thereon. On inside face 117A of turret block 117 is located release ridge 122. Release ridge 122 is integral with face 117A and projects outward therefrom. At one end of release ridge 122 is located a tapered release shoulder 120.

At distal ends of turret block 117 are located standoff blocks 114, with shaft 128 extending therebetween. Shaft 128 is located in the sliding plane. As can be seen in FIGS. 3 and 4, shaft 128 extends through extension 109 and within extension channel 126. Release tongue 124 is part of extension 109. When pocket door 10 is in the normal position, release shoulder 120 perches atop release tongue 124 as seen in FIG. 3. Extension channel 126 acts as a bearing surface along which shaft 128 may slide during emergency blow-out of pocket door 10. Bias means 130 will bias door segments 14 and 16 downward when such blow-out occurs.

Articulation means 20, when pocket door 10 is in a normal position and operating normally between an open and closed position, serves only one purpose. That is simply to mount door segments 14 and 16 to carrier means 18. In fact, if this were the only function of articulation means 20, there would be no need for them to "articulate." However, if there were a sudden decompression in the aircraft, or a force were exerted normal (perpendicular) to door segments 14 and 16 while they are in the closed position, articulation means 20 would allow door segments 14 and 16 to rotate out of the sliding plane and shift downward on their axes of rotation.

The rotation occurs in the following manner. FIG. 3 illustrates articulation means when the door is in the normal position. A decompressive or perpendicular force is exerted on door segment 14 and/or 16, which causes turret block 117 to rotate. As rotation commences, releasing face 118 will move out of flush relation with bearing face 110 (as shown in FIG. 3) and begin to pivot on bearing face 110 along pivot edges 116. At the same time, the flat top of release shoulder 120 will be rotating across support face 125 of release tongue 124. After about 5°-20° of rotation, release shoulder 120 will fall away from support face 125, allowing shaft 128 to slide through extension channel 126 and door segment 14 or 16 to drop toward floor 34 of plane. The dropping of door segments occurs due to gravity and under the urging of bias means 130. As rotation begins, sliding block 106 begins to slide out of receiving block 104 an inboard (towards the longitudinal axis of the fuse a along guide track 108. This maintains their axes of rotation flush with the sliding plane as door segments 14 and 16 rotate out of the sliding plane and shift downward in a response to forces perpendicular to the sliding plane.

Those aircraft with flat headliners will not require door segments 14 and 16 to drop along their respective axes of rotation as they blow-out because there is no curved headliner to "clear." In such aircraft, articulation means 20, as described, need only be modified by placement of a spacer sleeve or collar over shaft 128 between upper standoff block 118 (as seen in FIG. 3) and support face 125. In the alternative, articulation means 20 could be manufactured with release shoulder 120 shaped as an inverted "T" and thus prevent the dropping along the rotation axes.

Figure 5:
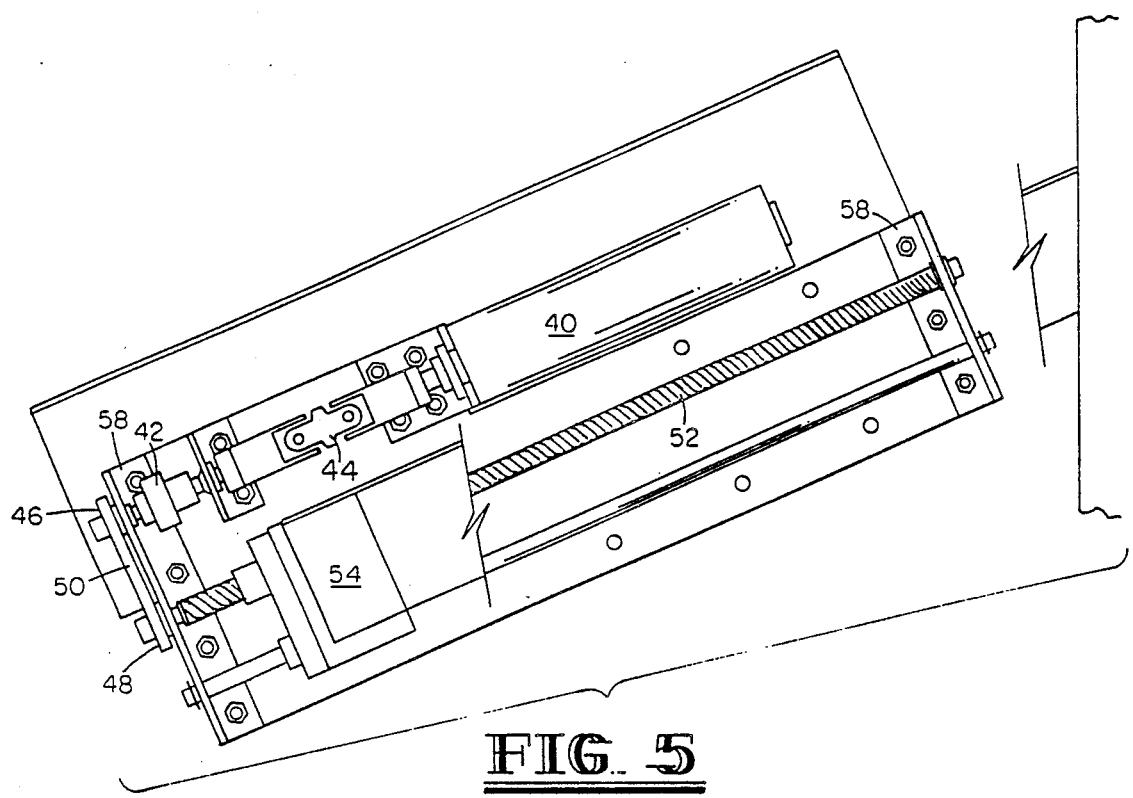
FIG. 5 is a cross-sectional elevation of the interior of the motor and drive mechanism of the pocket door.

FIG. 5 shows the detail of drive means 26. There are two drive means, each one operating door segment 14 or 16. Motor and gear head 40 are preferably electrical and are available through Micro-Mo, 742 2nd Avenue, St. Petersburg, Fla. 33701. They operate off the electrical systems of the aircraft as more fully set forth below. Motor and gear head 40 are operatively coupled to friction clutch 42 through universal coupling 44. Drive end of friction clutch 42 turns primary toothed pulley 46 which in turn drives secondary toothed pulley 48 through belt means. Secondary toothed pulley 48 turns lead screw 52. Attached means 54 rides longitudinally along lead screw 52 and guide bar 56, thus is connected to drive arm 24 for opening and closing pocket door 10. Appropriate mounting brackets 58 locate and secure components as shown in FIG. 5.

Figure 6:
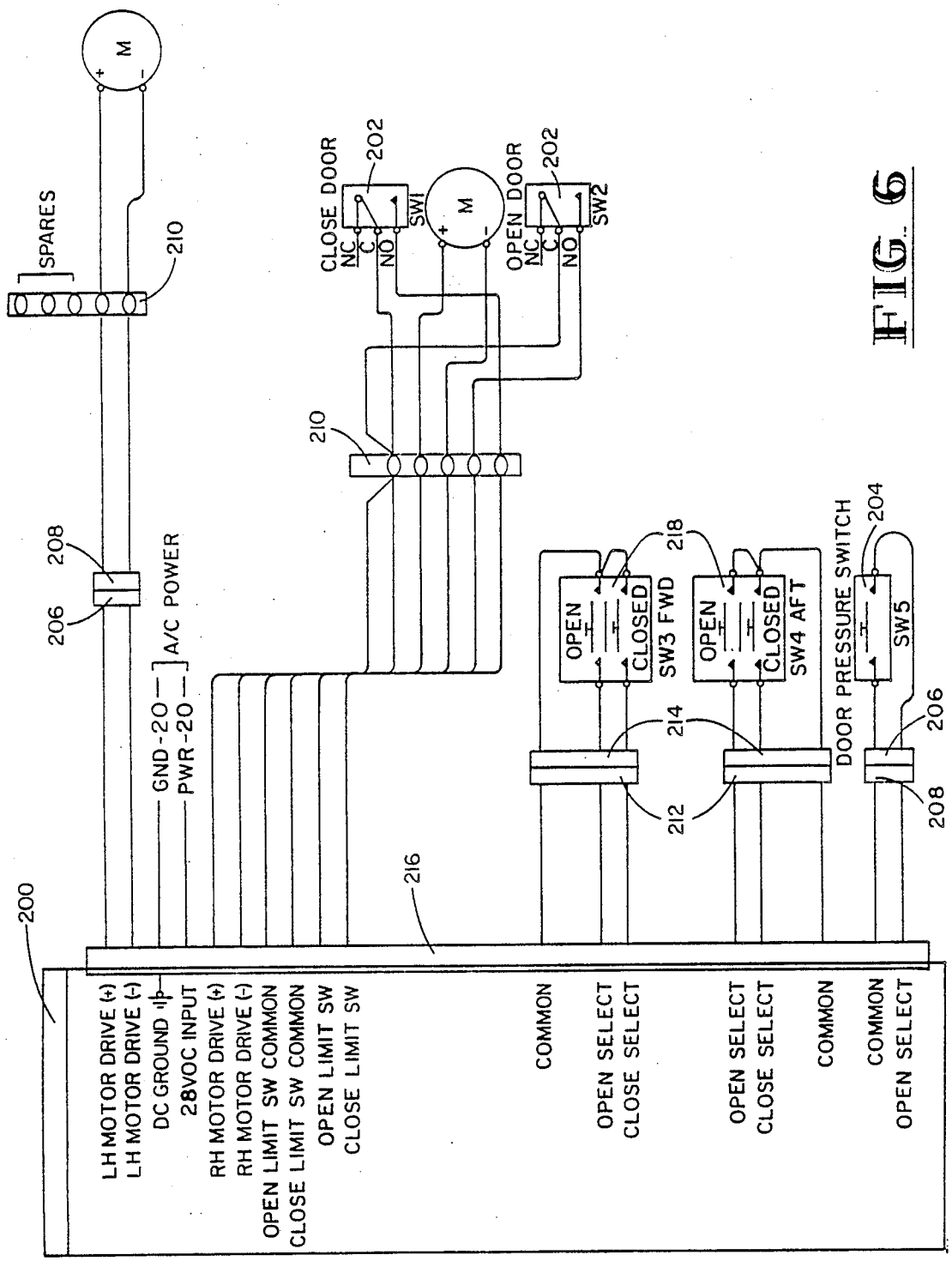
FIG. 6 is the schematic for the electric drive circuitry of the pocket door.

FIG. 6 shows electrical circuitry of the pocket door. The components are listed below on Table No. 1. They are all available from Steecon Enterprises, Inc., 18421 Gothard Street, Huntington Beach, California 92648.

TABLE 1

| Number | Quantity | Description |
| --- | --- | --- |
| 200 | 1 | Controller |
| 202 | 2 | Limit switch |
| 204 | 1 | Door pressure switch |
| 206 | 2 | Socket housing |
| 208 | 2 | Pin housing |
| 210 | 2 | Thermal strip |
| 212 | 2 | Plug (socket) |
| 214 | 2 | Plug (pin) |
| 216 | 1 | Plug |
| 218 | 2 | Switch plate (micro-touch) |

All wire is AWG20. All wiring should comply with MiL-Spec 22759 and all electrical components should be installed per FAR 4313, Chapter 11, Section 7. Spiral wraps (not shown) are used as required. All circuitry and components, including controller 200 is commercially available from Steecon. The circuit design allows a manual override in case of circuit failure.

It is to be understood that the invention may be used with a sliding pocket door which consists of only a single door which simply slides from one bulkhead pocket across the opening to abut a jamb opposite the pocket. In such a case, of course, only a single set of articulation means would be required, but their structure and function would be identical to those described for use with two door segments.

Although the invention has been described in connection with the preferred embodiment, it is not intended to limit the invention to the particular form set forth, but on the contrary, it is intended to cover such alternatives, modifications, equivalents as may be included within the spirit and scope of the invention as defined by the appended claims.

We claim:

1. For use in an aircraft interior, a pocket door capable of remaining intact during decompressive blow-out of the pocket door comprising:
   at least one generally tabular door segment comprised of durable but lightweight materials and sized to fit within a bulkhead of the aircraft interior;
   means for mounting said door segment to the aircraft interior wherein said mounting means is capable of sliding said door segment between an open position and a closed position, the open position allowing passage through the door and the closed position preventing such passage; and
   extensible articulation means for attaching said door segment to said mounting means, said extensible articulation means for allowing said door segment to rotate from a pre-rotation position in the sliding plane to a post-rotation position out of the sliding plane when the door is in a substantially closed position while simultaneously allowing the axis of rotation to shift inboard with respect to said mounting means, said extensible articulation means recessed within the bulkhead of the aircraft interior and hidden from the view of an occupant of the aircraft;
   wherein the combined motion of rotation and shifting prevents interference between said door segment and the aircraft interior when sudden pressure on the door causes a blow-out.

2. For use in an aircraft interior, a pocket door capable of remaining intact during decompressive blow-out of the pocket door comprising:
   at least two generally tabular door segments comprised of durable but lightweight materials and sized to fit within a bulkhead of the aircraft interior;
   means for mounting said door segments to the aircraft interior wherein said mounting means is capable of sliding said door segments between an open position and a closed position, the open position allowing passage through the door and the closed position preventing such passage, said mounting means for sliding each of said door segments in a substantially common sliding plane; and
   extensible articulation means for attaching said door segments to said mounting means, said extensible articulation means for allowing said door segments to rotate from a pre-rotation position in the sliding plane to a post-rotation position out of the sliding plane when the door is in a substantially closed position while simultaneously allowing their respective axes of rotation to shift inboard with respect to said mounting means, said extensible articulation means recessed within the bulkhead of the aircraft interior and hidden from the view of an occupant of the aircraft;
   wherein the combined motion of rotation and shifting prevents interference between said door segments and the aircraft interior when sudden pressure on the door causes a blow-out.

3. For use in an aircraft interior, a pocket door capable of remaining intact during decompressive blow-out of the pocket door comprising:
   two generally tabular door segments comprised of durable but lightweight materials and sized to fit within a bulkhead of the aircraft interior;
   means for mounting said door segments to the aircraft interior wherein said mounting means is capable of sliding said door segments between an open position and a closed position, the open position allowing passage through the door and the closed position preventing such passage, said mounting means for sliding each of said door segments in a substantially common sliding plane; and
   extensible articulation means for attaching said door segments to said mounting means, said extensible articulation means for allowing said door segments to rotate from a pre-rotation position in the sliding plane to a post rotation position out of the sliding plane when the door is in a substantially closed position while simultaneously allowing their respective axes of rotation to shift inboard with respect to said mounting means said extensible articulation means further capable of allowing said door segments to slide their axes while simultaneously shifting inboard said extensible articulation means recessed within the bulkhead and hidden from the view of an occupant of the aircraft;
   wherein the combined motion of rotation and shifting prevents interference between said door segments and the aircraft interior when sudden pressure on the door causes a blow-out.

4. The door as described in claim 3:
   wherein said mounting means are capable of raising and lowering said door segments with respect to the floor of the aircraft in response to closing and opening the door, such raising and lowering allowing said door segments to fit flush with a curved headliner of the aircraft interior, and
   wherein said tabular door segments further comprise extension means for maintaining contact between said door segments and the floor of the aircraft interior during the raising and lowering of the door segments.

5. The door as described in claim 2 or claim 3 wherein said articulation means is capable of resetting said door segments from a post-rotation position to a pre-rotation position in the sliding plane.

6. The door as described in claim 2 or claim 3 wherein said door segments are constructed of an aluminum skin and contain and aluminum honeycombed cellular core.

7. The door as described in claim 2 or claim 3, further including a motor means operatively engaging said mounting means for moving said door segments between the open and the closed position.

8. The door as described in claim 3 wherein said articulation means further includes a means biasing said door segments downward toward the aircraft floor.

9. The door as described in claim 2 or claim 3 further comprising means for adjustably controlling the amount of torque required to rotate said door segments out of the sliding plane.

10. An articulation means for use with a sliding pocket door of an aircraft interior, the pocket door comprising at least one door segment, the articulation means comprising:

frame means for mounting the door to an aircraft interior;

engagement means capable of extensibly engaging said frame means along a plane coincidental to the plane in which the door segment slides; and turret means operatively engaged with said engagement means and attached to the door for rotating the door out of the sliding plane while simultaneously extending said engagement means away from said frame means and for further allowing the door segments to drop along their axes of rotation.

11. A hinge for use with a sliding door, the hinge comprising:

a frame for attaching the sliding door to a door frame, said frame having at least two support brackets, one for attaching said frame to the sliding door and the other for attaching said frame to the door frame, said frame further having walls defining a receiving channel, said frame further having a bearing face, said bearing face adjacent to and perpendicular to said receiving channel, said receiving channel opening at said bearing face;

a turret, said turret comprising two generally rectangular stand-off blocks located at distal ends of a turret strut, said stand-off blocks having stand-off edges, said turret strut having a support ridge on an inner face thereof, said support ridge being parallel to said turret strut and having a shoulder at one end thereof, said turret further having at least two turret arms for attaching said turret to the sliding door, said turret further comprising a rod extending medially between said stand-off blocks and parallel to said support ridge of said turret strut;

a receiving block with a first and a second end, said receiving block dimensioned to slidably engage said receiving channel at the first end thereof and adapted to receive therein said rod of said turret at the second end thereof, the second end further having thereon a support means, said support means adapted to receive on an upper surface thereof said shoulder of said support ridge;

means biasing said receiving block into said receiving channel;

means maintaining proper alignment between said receiving block and said receiving channel; and means biasing said shoulder against said support ridge, wherein said stand-off blocks rest in flush relation with said bearing face of said frame and said shoulder rests on said support means during normal operation of the sliding door, but when the sliding door is rotated, said turret rotates along said rod with said stand-off blocks rotating off said bearing faces along said stand-off edges and simultaneously allowing said receiving block to move partially out of said receiving channel, said rotation further allowing said shoulder to disengage said support means and thereby allowing said turret to slide along its axis of rotation, allowing the door to move vertically with respect to said frame.

* * * * *